US010992246B2

(12) United States Patent
Nishijima et al.

(10) Patent No.: US 10,992,246 B2
(45) Date of Patent: Apr. 27, 2021

(54) CONTROLLER FOR AC ROTARY MACHINE

(71) Applicant: Mitsubishi Electric Corporation, Tokyo (JP)

(72) Inventors: Yoshimasa Nishijima, Tokyo (JP); Keiichi Enoki, Tokyo (JP); Masutaka Watanabe, Tokyo (JP); Yasukazu Murata, Hyogo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 300 days.

(21) Appl. No.: 15/768,885

(22) PCT Filed: Dec. 7, 2015

(86) PCT No.: PCT/JP2015/084283
§ 371 (c)(1),
(2) Date: Apr. 17, 2018

(87) PCT Pub. No.: WO2017/098555
PCT Pub. Date: Jun. 15, 2017

(65) Prior Publication Data
US 2020/0244201 A1 Jul. 30, 2020

(51) Int. Cl.
*H02P 21/00* (2016.01)
*H02P 25/20* (2006.01)

(52) U.S. Cl.
CPC .............. *H02P 21/50* (2016.02); *H02P 25/20* (2013.01)

(58) Field of Classification Search
CPC .......... H02P 6/12; H02P 29/024; H02P 25/22; B62D 5/04
See application file for complete search history.

(56) References Cited

U.S. PATENT DOCUMENTS 9,257,930 B2 * 2/2016 Suzuki .................... H02P 25/22
2011/0074333 A1 3/2011 Suzuki
(Continued)

FOREIGN PATENT DOCUMENTS

CN 103532476 A 1/2014
CN 104137412 A 11/2014
(Continued)

OTHER PUBLICATIONS

International Search Report for PCT/JP2015/084283 dated Jan. 12, 2016 [PCT/ISA/210].
(Continued)

*Primary Examiner* — Bickey Dhakal
(74) *Attorney, Agent, or Firm* — Sughrue Mion, PLLC; Richard C. Turner

(57) ABSTRACT

To provide a controller for an AC rotary machine capable of performing on/off control of the switching device of the set which does not fail, by considering the state of the AC rotary machine related to the windings of the failed set. A controller for an AC rotary machine, about a set in which the switching device failed, stops dq-axis current control, and turns on, in the case of the short circuit failure, and turns off, in the case of the open circuit failure, at least the respective phase switching devices of the positive electrode side or the negative electrode side which is the same side as the failed switching device; and about a set which does not fail, continues dq-axis current control and changes the current component of the d-axis according to the state of the AC rotary machine related to the windings of the failed set.

7 Claims, 7 Drawing Sheets

(56) References Cited

U.S. PATENT DOCUMENTS

2014/0009093 A1    1/2014  Suzuki
2014/0368150 A1*  12/2014  Furukawa ............. H02P 29/032
                                                         318/564
2018/0131306 A1*   5/2018  Suzuki ................. B62D 5/0487

FOREIGN PATENT DOCUMENTS

| JP | 2011-078230 A | 4/2011 |
| JP | 2014-014240 A | 1/2014 |
| JP | 2015-104235 A | 6/2015 |
| WO | 2013/125057 A1 | 8/2013 |

OTHER PUBLICATIONS

Communication dated Jan. 12, 2021, issued by the National Intellectual Property Office of the People's Republic of China in application No. 201580085037.1.

* cited by examiner

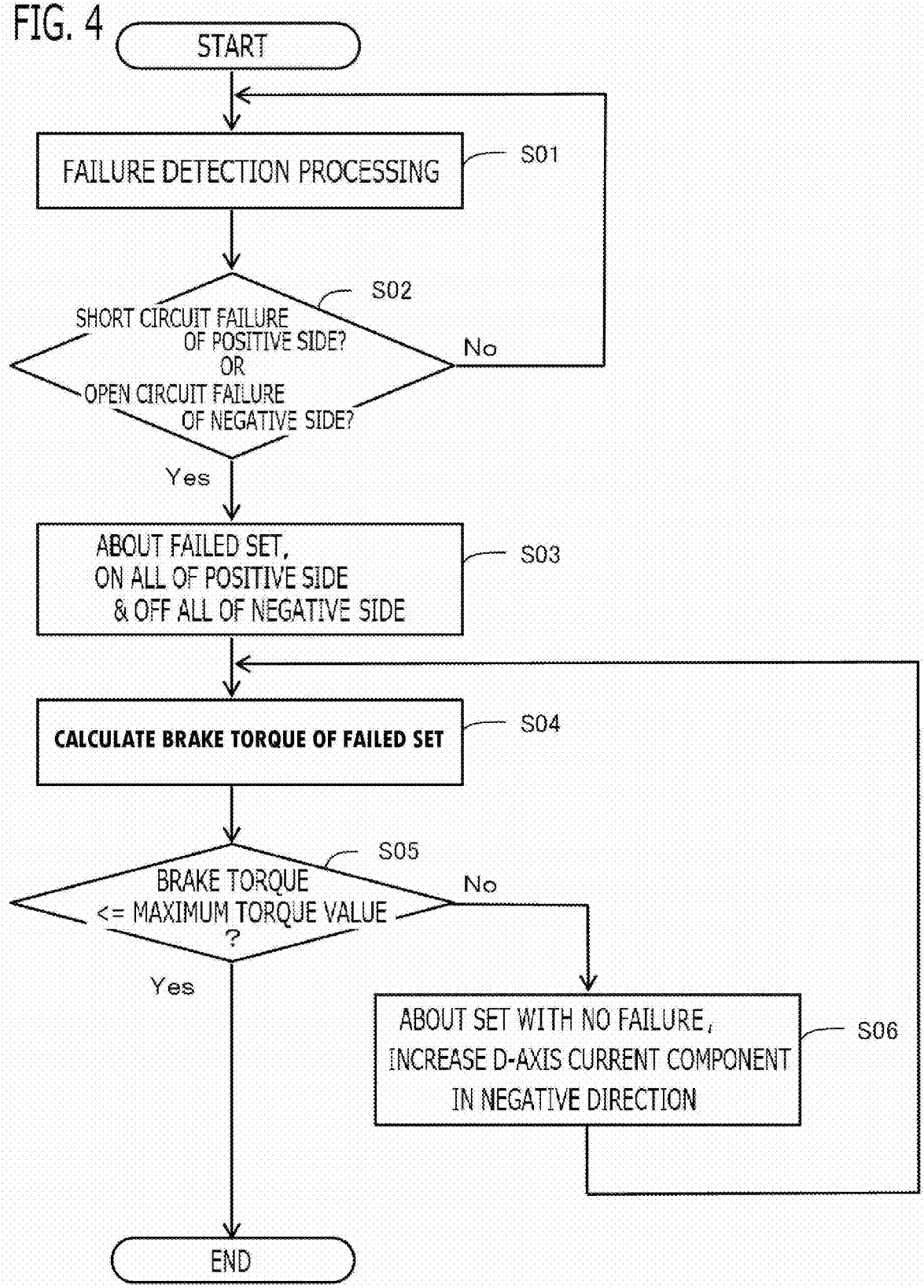

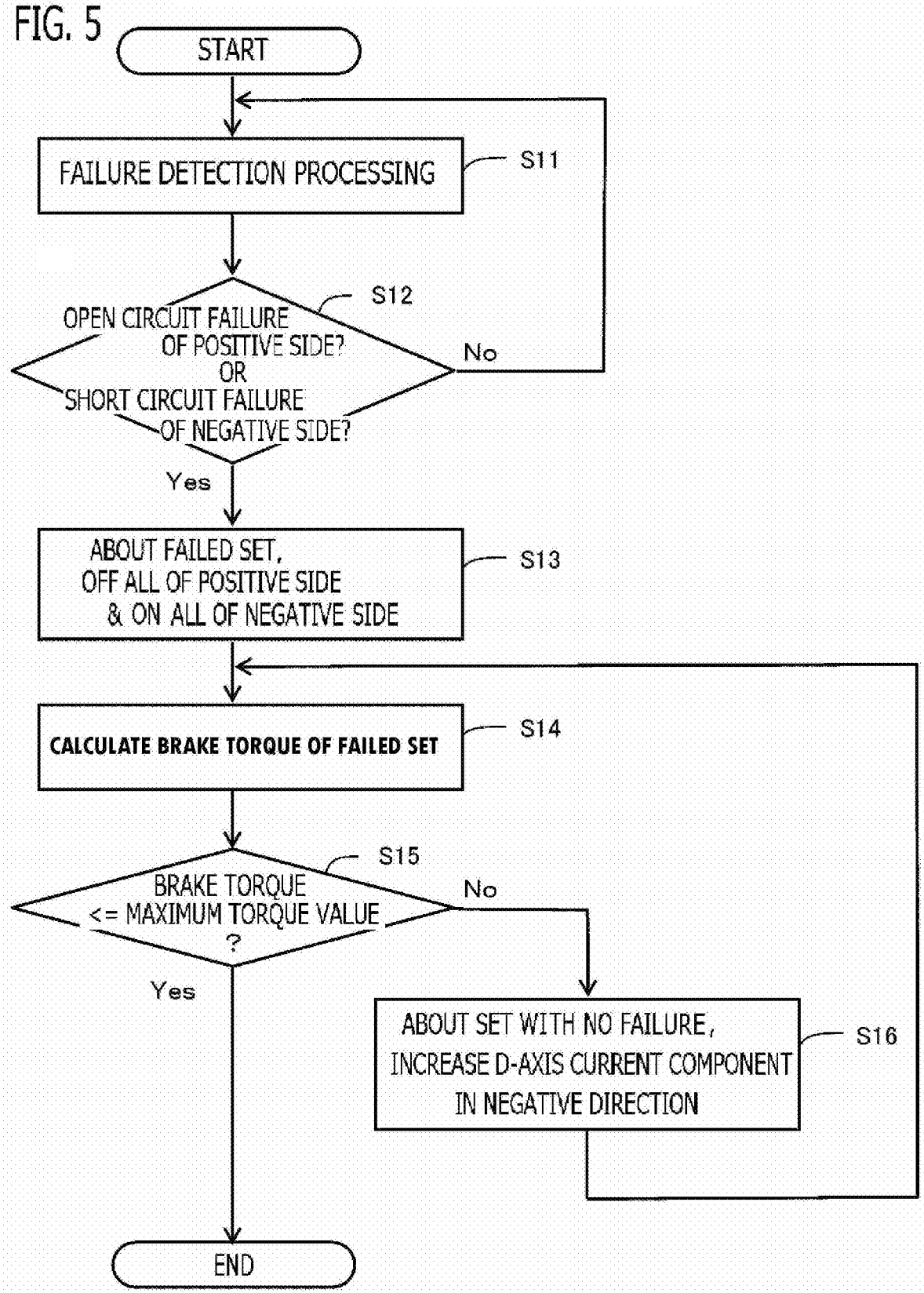

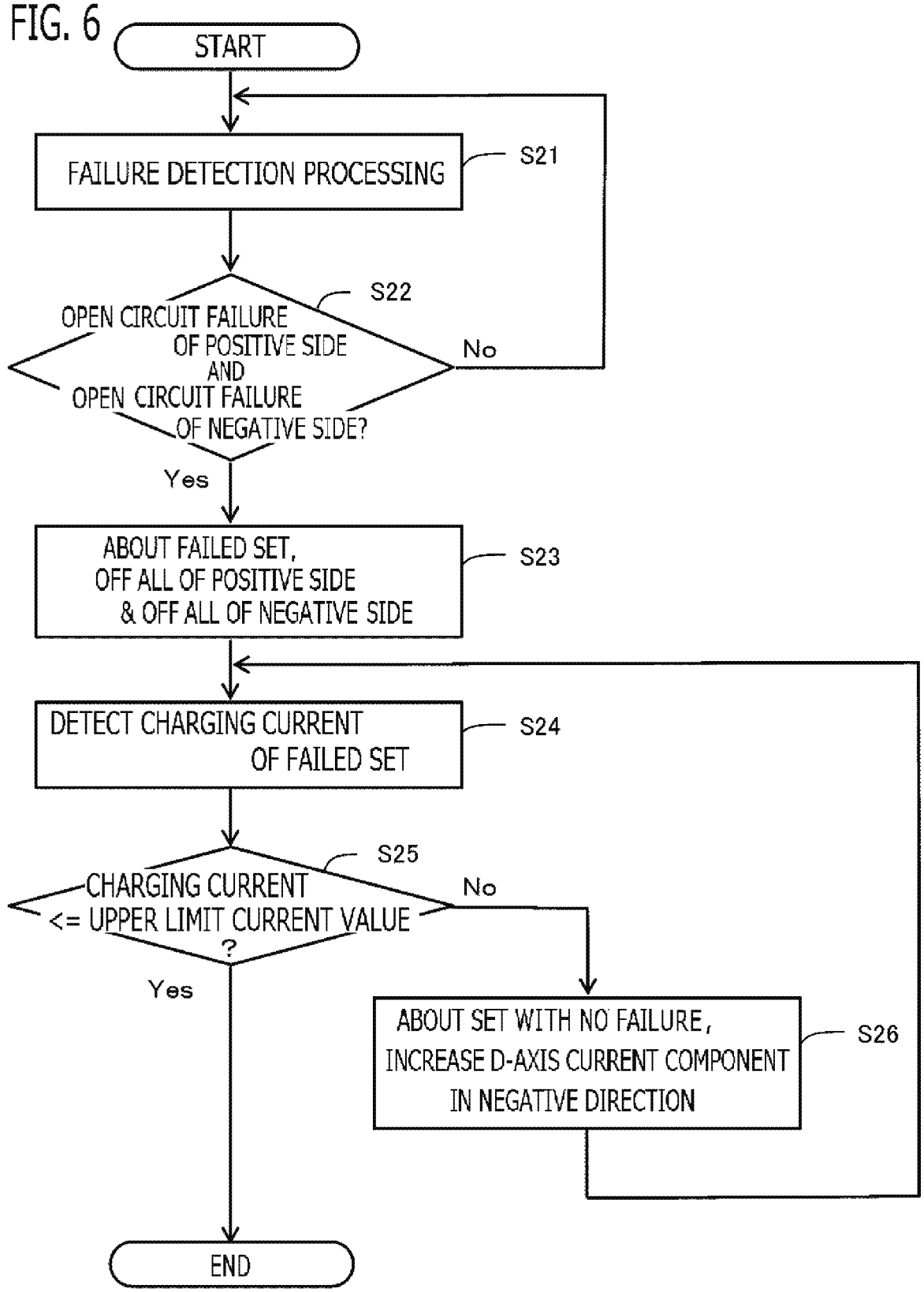

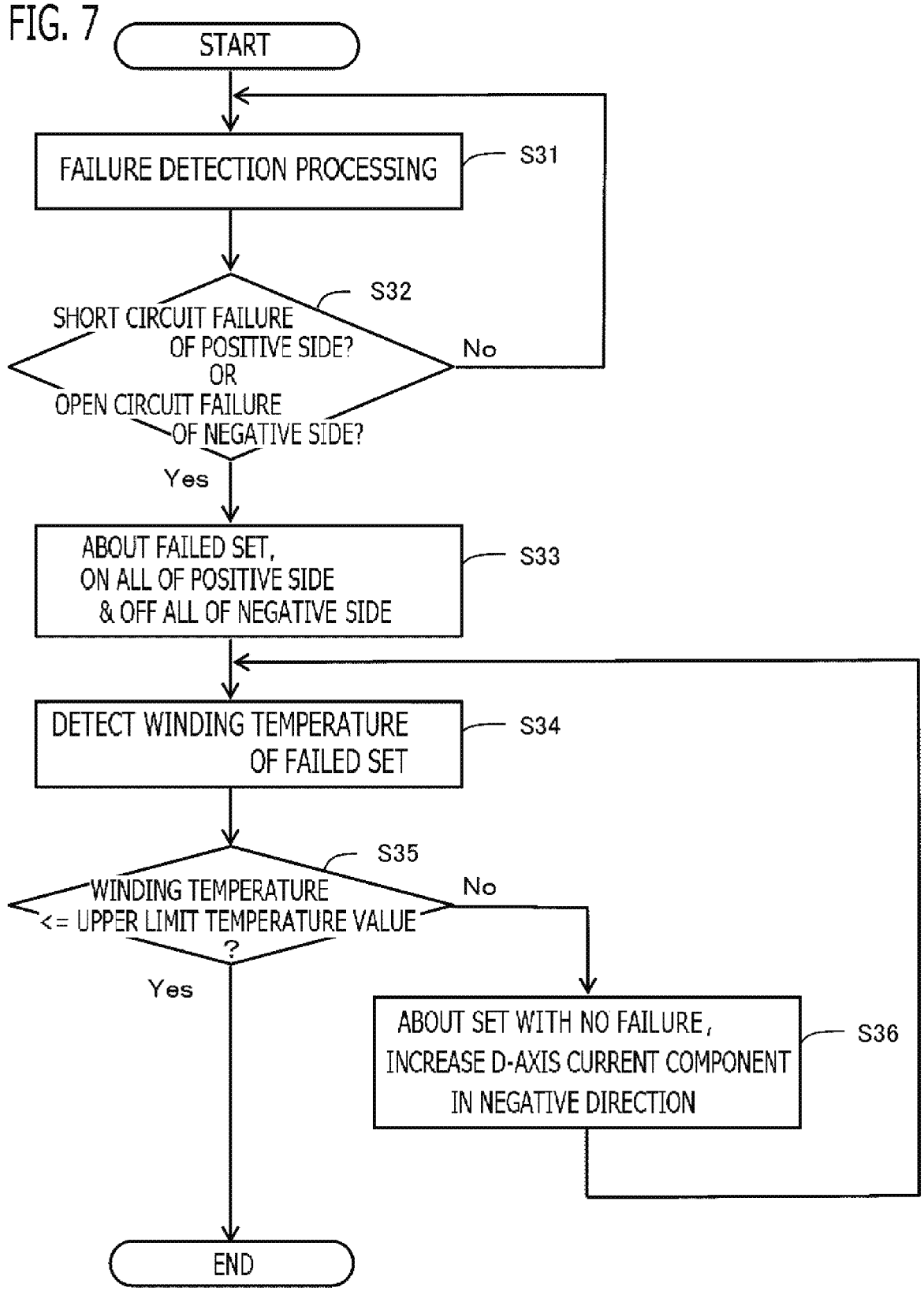

CONTROLLER FOR AC ROTARY MACHINE

CROSS REFERENCE TO RELATED APPLICATIONS

This application is a National Stage of International Application No. PCT/JP2015/084283 filed Dec. 7, 2015.

TECHNICAL FIELD

The present disclosure relates to a controller for an AC rotary machine provided with a stator that is provided with plural sets of plural phase windings and a rotor that is provided with a permanent magnet.

BACKGROUND ART

The electric power converter (inverter) is mounted on the electric motor, such as the electric vehicle and the hybrid vehicle, and is connected with the AC rotary machine. The electric power converter has the power conversion function which drives the AC rotary machine by converting DC power supplied from the DC power source into AC power, and charge the DC power source by converting AC power generated by the AC rotary machine into DC power.

In order to realize these power conversion functions, the electric power converter generally uses the switching device, such as MOSFET (Metal Oxide Semiconductor Field Effect Transistor) and IGBT (Insulated Gate Bipolar Transistor). The electric power converter performs power conversion by switching on state and off state of the switching device appropriately.

When the switching device failed and remains in on state (short circuit failure) or off state (open circuit failure), the electric power converter becomes difficult to perform power conversion in the normal state, and unintended generation of torque and unintended charge will be performed as it is.

As a technology for continuing driving the AC rotary machine even in failure of the switching device, for example, the technology in PLT 1 is disclosed. In the technology in PLT 1, when the short circuit failure or the open circuit failure of the switching device is detected, about the electric power converter of the failed set, the respective phase switching devices on the same electric potential side as the failed device are set to the same state as the failed device, and about the electric power converter of the set which does not fail, the on/off control of the switching devices is continued.

CITATION LIST

Patent Literature

PLT 1: WO-A-2013-125057

SUMMARY OF INVENTION

Technical Problem

However, in the failed set, the state of the AC rotary machine, such as brake torque, related to the windings of the failed set may be in the undesirable state. In the technology in PLT 1, the state of the AC rotary machine related to the windings of the failed set is not taken into consideration in the on/off control of the switching devices of the set which does not fail.

Thus, it is desirable to provide a controller for an AC rotary machine capable of performing on/off control of the switching device of the set which does not fail, by considering the state of the AC rotary machine related to the windings of the failed set.

Solution to Problem

An AC rotary machine controller according to the present disclosure is a controller for an AC rotary machine provided with a stator that is provided with m sets (m is a natural number of greater than or equal to two) of n-phase windings (n is a natural number of greater than or equal to two) and a rotor that is provided with a permanent magnet, the controller for the AC rotary machine includes the m sets of an electric power converter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a switching control unit that, about each set of the m sets, performs dq-axis current control that controls currents flowing into the windings on a dq-axis rotating coordinate system consisting of a d-axis defined in a N pole direction of the permanent magnet and a q-axis defined in a direction advanced to the d-axis by 90 degrees in an electrical angle, and performs on/off control of the each switching device;

a failure detection unit that detects short circuit failure and open circuit failure of the each switching device; and a driving condition detection unit that detects a state of the AC rotary machine related to the windings of a set in which the switching device failed, Wherein when failure of the switching device is detected by the failure detection unit, the switching control unit, about the electric power converter of a set in which the switching device failed, stops the on/off control of the switching devices by the dq-axis current control, and turns on, in the case of the short circuit failure, and turns off, in the case of the open circuit failure, at least the respective phase switching devices of the positive electrode side or the negative electrode side which is the same side as the failed switching device; and about the electric power converter of a set in which the switching devices do not fail, continues the on/off control of the switching devices by the dq-axis current control, and changes a current component of the d-axis according to the state of the AC rotary machine related to the windings of the failed set, detected by the driving condition detection unit.

Advantage of the Invention

By the n-phase windings controlled by the electric power converter of the set in which the switching device failed, occurrence of undesirable torque fluctuation of the AC rotary machine can be suppressed. On the other hand, by the n-phase windings controlled by the electric power converter of the set in which the switching devices do not fail, the AC rotary machine can generate torque usually. In this case, by changing the current component of the d-axis concerning the n-phase windings of the set with no failure, the magnetic flux in the d-axis direction where the magnetic flux of the permanent magnet exists can be changed. That is to say, the flux linkage in the d-axis direction by the permanent magnet can be changed apparently. This change of the flux linkage in the d-axis direction acts also on the n-phase windings of the failed set. Since the current component of the d-axis changes according to the state of the AC rotary machine related to the n-phase windings of the failed set, the state of the AC rotary machine related to the n-phase windings of the failed set can be changed appropriately. Therefore, even when the switching device failed, the AC rotary machine can be driven appropriately.

BRIEF DESCRIPTION OF THE DRAWINGS

FIG. 4 is a flowchart representing the processing by the controller for the AC rotary machine according to Embodiment 1 of the present disclosure;

FIG. 5 is a flowchart representing the processing by the controller for the AC rotary machine according to Embodiment 2 of the present disclosure;

FIG. 6 is a flowchart representing the processing by the controller for the AC rotary machine according to Embodiment 3 of the present disclosure; and FIG. 7 is a flowchart representing the processing by the controller for the AC rotary machine according to Embodiment 4 of the present disclosure.

DESCRIPTION OF EMBODIMENTS

1. Embodiment 1

Figure 1:
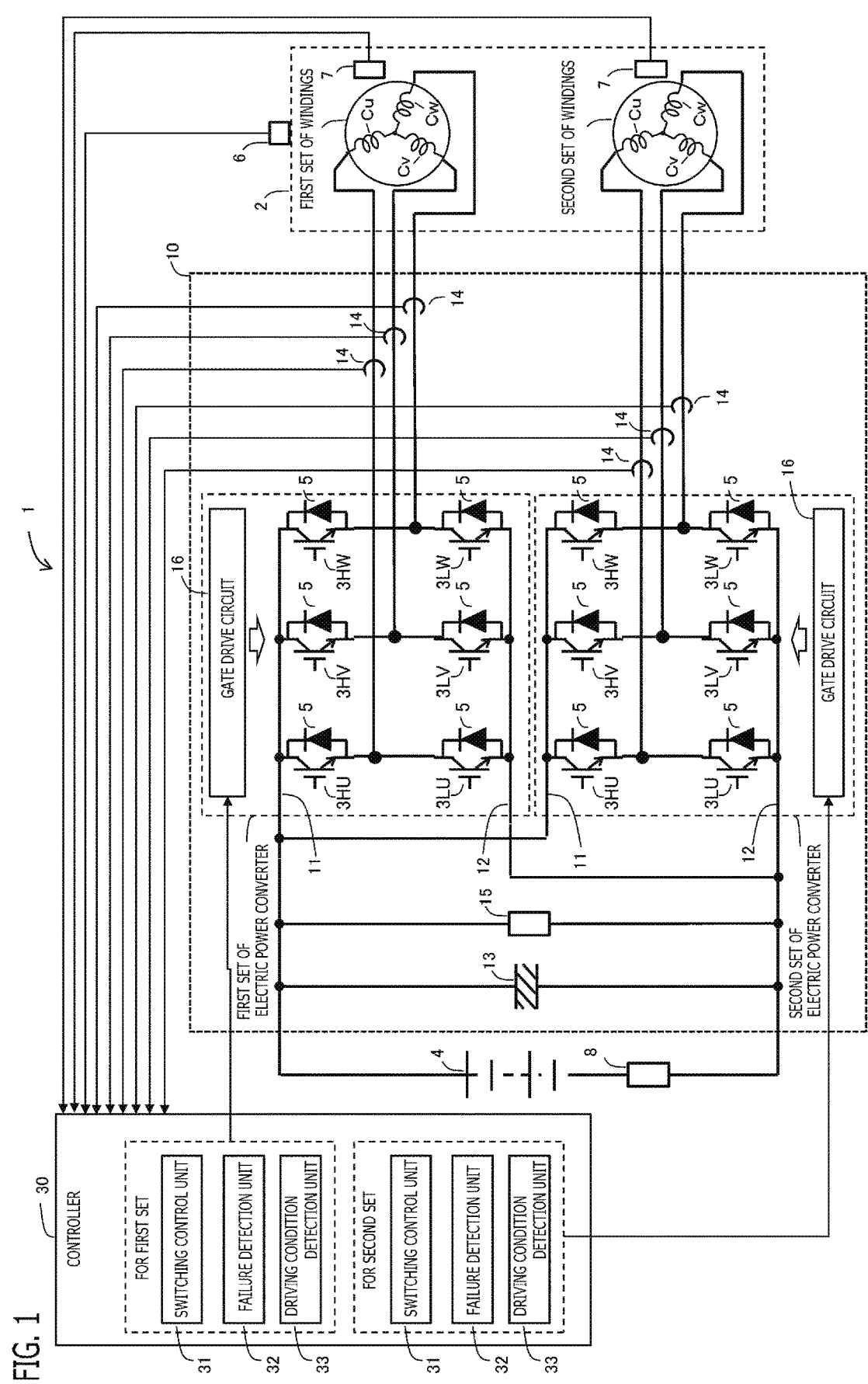
FIG. 1 is a schematic configuration diagram of an AC rotary machine and a controller according to Embodiment 1 of the present disclosure.

A controller 1 for an AC rotary machine 2 (hereinafter, referred to simply as the controller 1) according to Embodiment 1 will be explained with reference to the drawings. FIG. 1 is a schematic configuration diagram of the AC rotary machine 2 and the controller 1 according to the present embodiment.

The AC rotary machine 2 is a permanent magnet synchronous AC rotary machine, and is provided with a stator that is provided with m sets (m is a natural number of greater than or equal to two) of n-phase windings (n is a natural number of greater than or equal to two), and a rotor that is provided with a permanent magnet. The AC rotary machine 2 is provided with one stator fixed to a nonrotation member, and one rotor which is disposed at the radial-direction inner side of the stator and is pivotably supported by a nonrotation member. The one stator is provided with the m sets of n-phase windings, and the one rotor is provided with one or a plurality of pole pairs of the permanent magnets. A rotating magnetic field generated by each set of the m sets of n-phase windings provided in the one stator acts on the one or the plurality of pole pairs of the permanent magnets provided in the one rotor; and a magnetic field generated by the one or the plurality of pole pairs of the permanent magnets provided in the one rotor acts on each set of the m sets of n-phase windings provided in the one stator.

In the present embodiment, n=3, m=2, and the one stator is provided with two sets of the three phase windings. The first set of three phase windings consists of U phase winding Cu, V phase winding Cv, and W phase winding Cw. The second set of three phase windings consists of U phase winding Cu, V phase winding Cv, and W phase winding Cw. Each set of the three phase windings Cu, Cv, Cw are connected by star connection. The three phase windings may be connected by Δ connection.

The controller 1 is provided with an electric power converter 10 which has a plurality of switching devices and performs a DC/AC conversion between a DC power source 4 and the three phase windings. The electric power converter 10 is provided one by one about each set of three phase windings. Two sets of the electric power converters 10 are provided in total. Each set of the electric power converter 10 is provided with a positive electrode side wire 11 connected to a positive electrode of the DC power source 4, and a negative electrode side wire 12 connected to a negative electrode of the DC power source 4. Each set of the electric power converters 10 is provided with three sets of a series circuit (leg) where a positive electrode side switching device 3H (upper arm) connected to the positive electrode side (the positive electrode side wire 11) of the DC power source 4 and a negative electrode side switching device 3L (lower arm) connected to the negative electrode side (the negative electrode side wire 12) of the DC power source 4 are connected in series, corresponding to respective phase of the three phase windings. Thus, each set of the electric power converters 10 is provided with a total of six switching devices of the three positive electrode side switching devices 3HU, 3HV, 3HW, and the three negative electrode side switching devices 3LU, 3LV, 3LW. Then, a connection node where the positive electrode side switching device 3H and the negative electrode side switching device 3L are connected in series is connected to the winding of the corresponding phase.

Specifically, in each phase of the series circuit, the collector terminal of the positive electrode side switching device 3H is connected to the positive electrode side wire 11, the emitter terminal of the positive electrode side switching device 3H is connected to the collector terminal of the negative electrode side switching device 3L, and the emitter terminal of the negative electrode side switching device 3L is connected to the negative electrode side electric wire 12. The connection node connected in series to the positive pole side switching device 3H and the negative pole side switching device 3L is connected to the winding of the corresponding phase. An IGBT (Insulated Gate Bipolar Transistor) in which a free wheel diode is connected in reversely parallel, a MOSFET (Metal Oxide Semiconductor Field Effect Transistor), and the like are used for the switching device. The electric power converter 10 is provided with free wheel diodes 5 which are connected in inverse parallel with the respective switching devices.

Each set of the electric power converters 10 is provided with the gate drive circuit 16 which drives the switching devices. The gate drive circuit 16 is connected to the gate terminal which is a control terminal of each switching device (unillustrated). The gate drive circuit 16 outputs on voltage signal or off voltage signal to each switching device according to a control signal transmitted via a photo coupler and the like from the controller 30, and makes each switching device on state or off state.

Each set of the electric power converters 10 is provided with a current sensor 14 for detecting current which flows into each winding. The current sensor 14 is provided on the each phase wire which connects the series circuit of the switching devices and the winding. The electric power converter 10 is provided with a smoothing capacitor 13 connected between the positive electrode side electric wire 11 and the negative electrode side electric wire 12. The electric power converter 10 is provided with a voltage sensor 15 for detecting a voltage (system voltage) between the positive electrode side wire 11 and the negative electrode side wire 12. The AC rotary machine 2 is provided with a rotation speed sensors 6, such as a resolver, for detecting a rotational angle speed and a rotational angle (magnetic pole position) of the rotor. The AC rotary machine 2 is provided with a winding temperature sensor 7 for detecting a temperature of each set of the windings.

A chargeable and dischargeable electricity accumulation device (for example, a lithium ion battery, a nickel hydoride battery, an electrical double layer capacitor) is used for the DC power source 4. The DC power source 4 may be provided with a DC-DC converter which is a DC power converter which steps up or steps down DC voltage. The DC power source 4 is provided with a power current sensor 8 for detecting the current which flows into the DC power source 4. The output signals of these various sensors of the current sensors 14, the voltage sensor 15, the rotation speed sensor 6, the winding temperature sensor 7, the power supply current sensor 8, and the like are inputted into the controller 30.

Figure 2:
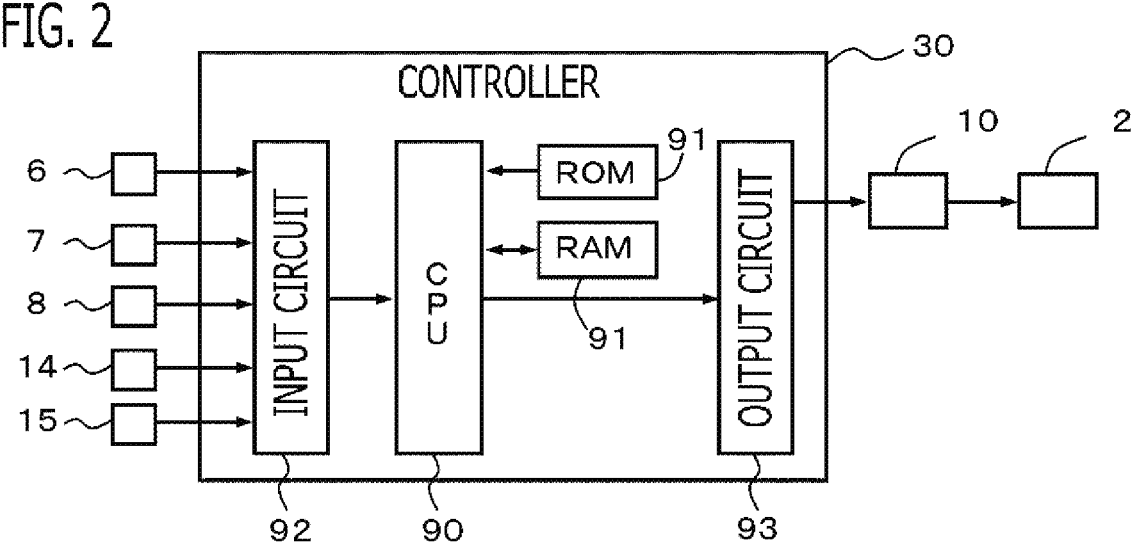
FIG. 2 is a hardware configuration diagram of the controller according to Embodiment 1 of the present disclosure.

The controller 1 is provided with the controller 30 which controls the AC rotary machine 2 by controlling two sets of the electric power converters 10. The controller 30 is provided with functional parts of a switching control unit 31, a failure detection unit 32, a driving condition detection unit 33, and the like, described below. Respective functions of the controller 30 are realized by processing circuits provided in the controller 30. Specifically, as shown in FIG. 2, the controller 30 is provided, as the processing circuits, with a calculation processor (computer) 90 such as a CPU (Central Processing Unit) and a DSP (Digital Signal Processor), storage apparatuses 91 that exchange data with the calculation processor 90, an input circuit 92 that inputs external signals to the calculation processor 90, an output circuit 93 that outputs signals from the calculation processor 90 to the outside, and the like. As the storage apparatuses 91, there are provided a RAM (Random Access Memory) which can read data and write data from the calculation processor 90, a ROM (Read Only Memory) which can read data from the calculation processor 90, and the like. The input circuit 92 is connected with various kinds of sensors and switches such as the current sensor 14, and is provided with an A/D converter and the like for inputting output signals from the sensors and the switches to the computing processing unit 90. The output circuit 93 is connected with electric loads such as the gate drive circuits 16, and is provided with a driving circuit and the like for outputting a control signal from the calculation processor 90. In the present embodiment, the input circuit 92 is connected to the current sensor 14, the voltage sensor 15, the rotation speed sensor 6, the winding temperature sensor 7, the power supply current sensor 8, and the like. The output circuit 93 is connected with the electric power converters 10 (the gate drive circuits 16) and the like.

Then, the computing processing unit 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 through 33 included in the controller 1 are realized. Each function of the controller 30 will be described in detail below.

The driving condition detection unit 33, about each set, detects currents Iu, Iv, Iw which flow into the respective phase windings Cu, Cv, Cw of the AC rotary machine 2 from the electric power converter 10 based on the output signal of the current sensor 14. The driving condition detection unit 33 detects the rotational angle speed and the rotational angle (magnetic pole position) of the rotor based on the output signal of the rotation speed sensor 6. The driving condition detection unit 33 detects the input voltage (system voltage) based on the output signal of the voltage sensor 15.

The switching control unit 31 is provided with a dq-axis current control unit 35. The dq-axis current control unit 35, about each set, performs dq-axis current control that controls the currents flowing into the windings on a dq-axis rotating coordinate system, and performs on/off controls of the each switching device. The dq-axis rotating system consists of a d-axis defined in the direction of the N pole (magnetic pole position) of the permanent magnet provided in the rotor and a q-axis defined in the direction advanced to d-axis by 90 degrees (π/2) in an electrical angle, and which is the two-axis rotating coordinate system which rotates synchronizing with rotation of the rotor in the electrical angle.

Figure 3:
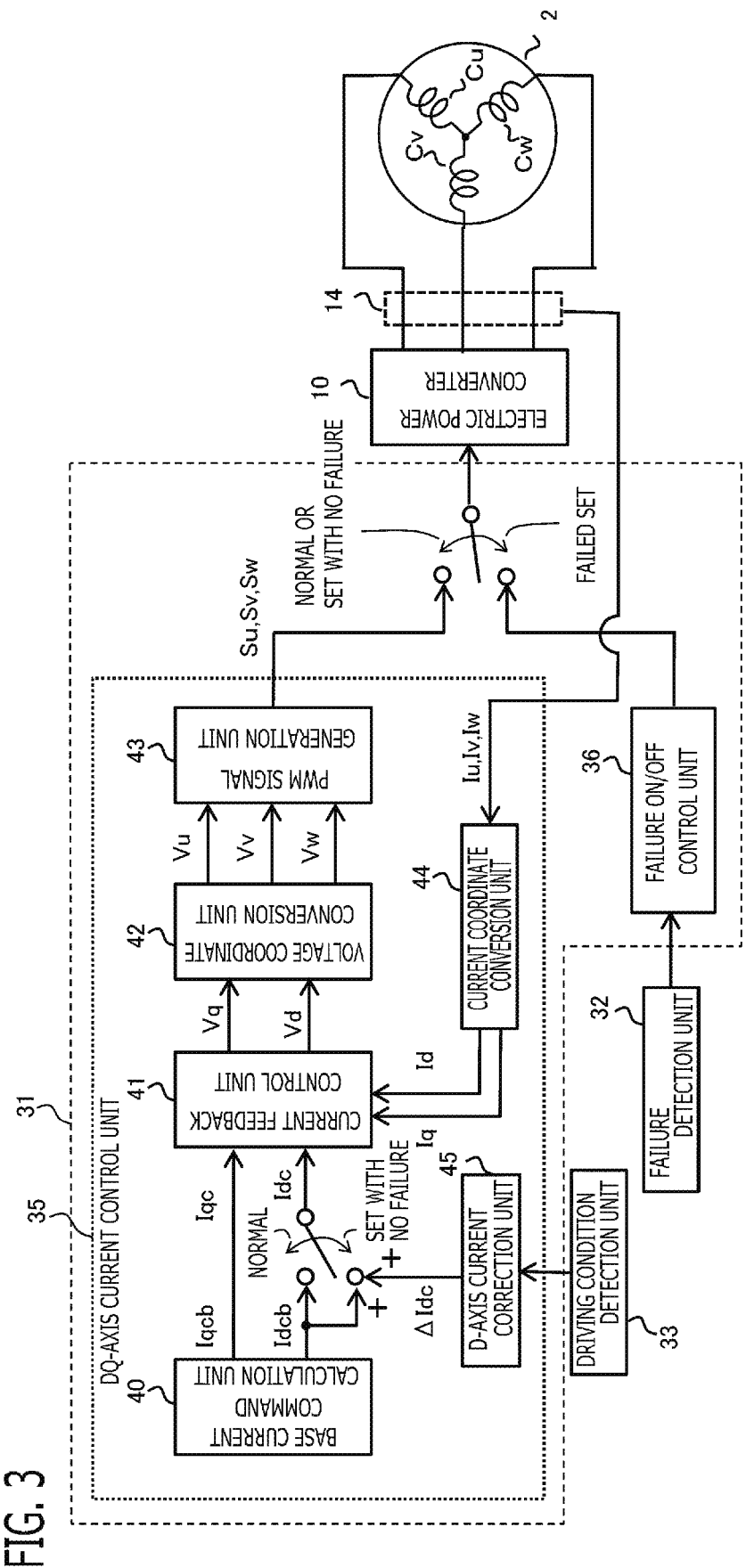
FIG. 3 is a block diagram of the controller for the AC rotary machine according to Embodiment 1 of the present disclosure.

In the present embodiment, as shown in the block diagram of FIG. 3, the dq-axis current control unit 35, about each set, is provided with a base current command calculation unit 40, a current feedback control unit 41, a voltage coordinate conversion unit 42, a PWM signal generation unit 43, a current coordinate conversion unit 44, and the like.

The base current command calculation unit 40 calculates a d-axis base current command value Idcb and a q-axis base current command value Iqcb which expressed base command values of the currents flowing into each set of the three phase windings Cu, Cv, Cw in the dq-axis rotating coordinate system.

For example, the base current command calculation unit 40 calculates the d-axis base current command value Idcb and the q-axis base current command value Iqcb which make the AC rotary machine 2 output a target torque. The base current command calculation unit 40 calculates the dq-axis base current command values Idcb, Iqcb according to current vector control methods, such as maximum torque current control, magnetic flux weakening control, Id=0 control, and maximum torque magnetic flux control. In the maximum torque current control, the dq-axis base current command values Idcb, Iqcb which maximize the generated torque for the same current are calculated. In the magnetic flux weakening control, the dq-axis base current command values Idcb, Iqcb are moved on a constant induced voltage ellipse according to the target torque. In the Id=0 control, the d-axis base current command value Idcb is set to zero, and the q-axis base current command value Iqcb is changed according to the target torque and the like. In the maximum torque magnetic flux control, the dq-axis base current command values Idcb, Iqcb in which a flux linkage is minimized for the same torque generation are calculated.

In a normal case where failure occurs in neither set of the switching devices, the dq-axis base current command values Idcb, Iqcb are inputted into the current feedback control unit 41 as they are, as the dq-axis current command values Idc, Iqc. On the other hand, in a case of changing the current component of the d-axis by the d-axis current correction unit 45, since failure occurs in other sets of the switching devices although failure does not occur in this set of the switching devices; the d-axis current command value Idc after changing the d-axis base current command value Idcb by the d-axis current correction unit 45 is inputted into the current feedback control unit 41.

The current coordinate conversion unit 44 converts three phase currents Iu, Iv, Iw, which flow into the respective phase windings and are detected by the driving condition detection unit 33, into a d-axis current Id and a q-axis current Iq which expressed in the dq-axis rotating coordinate system, by performing a three-phase/two-phase conversion and a rotating coordinate conversion based on the magnetic pole position. The current feedback control unit 41 performs current feedback control that changes a d-axis voltage command value Vd and a q-axis voltage command value Vq, which expressed voltage command signals applied to the AC rotary machine 2 in the dq-axis rotating coordinate system, by PI control or the like so that the dq-axis currents Id, Iq approach to the dq-axis current command values Idc, Iqc. Then, the voltage coordinate conversion unit 42 converts the dq-axis voltage command values Vd, Vq into three-phase AC voltage command values Vu, Vv, Vw which are AC voltage command values to the respective three phase windings, by performing a fixed coordinate conversion and a two-phase/three-phase conversion based on the magnetic pole position.

The PWM signal generation unit 43 compares each of the three-phase AC voltage command values Vu, Vv, Vw with a carrier wave (a triangular wave) which has an vibration width of the system voltage and vibrates at a carrier frequency; and then turns on a rectangular pulse wave when the AC voltage command value exceeds the carrier wave, and turns off the rectangular pulse wave when the AC voltage command value bellows the carrier wave. The PWM signal generation unit 43 outputs the respective phase rectangular pulse waves of three phases as respective phase inverter control signals Su, Sv, Sw of three phases to the electric power converter 10.

The failure detection unit 32, about each set of the electric power converters 10, detects short circuit failure and open circuit failure of each switching device. In the present embodiment, the failure detection unit 32, about each set, determines failure, based on the currents Iu, Iv, Iw flowing into the respective phase windings detected by the current sensor 14 and the setting values of the inverter control signals Su, Sv, Sw which turn on or turn off the respective switching devices. In a case of determining that the current does not flow into the switching device in spite of commanding the on signal to the switching device, the failure detection unit 32 determines that the open circuit failure of the switching device occurs. On the other hand, in a case of determining that the current flows into the switching device in spite of commanding the off signal to the switching device, the failure detection unit 32 determines that the short circuit failure of the switching device occurs. For example, the failure detection unit 32 determines failure by comparing a failure pattern with the actual inverter control signals Su, Sv, Sw and the actual respective phase currents Iu, Iv, Iw. The failure pattern preliminarily memorized a relationship between on-off setting values of respective phase of the inverter control signals Su, Sv, Sw, and respective phase currents Iu, Iv, Iw in a case where the short circuit failure or the open circuit failure occurs in each switching device.

Alternatively, the current sensor may be provided for the each switching device; and the failure detection unit 32 may determine failure based on the on signal or the off signal of each switching device and the current value flowing through each switching device detected by the current sensor.

The driving condition detection unit 33 detects a state of the AC rotary machine 2 related to the windings of a set in which the switching device failed. Then, when failure of the switching device is detected by the failure detection unit 32, the switching control unit 31, about the electric power converter 10 of a set in which the switching device failed, stops the on/off control of the switching devices by the dq-axis current control; and performs a failure on/off control that turns on, in the case of the short circuit failure, and turns off, in the case of the open circuit failure, at least the respective phase switching devices of the positive electrode side or the negative electrode side which is the same side as the failed switching device. The switching control unit 31, about the electric power converter 10 of the set in which the switching devices do not fail, continues the on/off control of the switching devices by the dq-axis current control; and performs a d-axis current correction that changes the current component of the d-axis according to the state of the AC rotary machine 2 related to the windings of the failed set, detected by the driving condition detection unit 33.

According to this configuration, by the three phase windings controlled by the electric power converter 10 of the set in which the switching device failed, occurrence of torque fluctuation such as torque ripple can be suppressed. On the other hand, by the three phase windings controlled by the electric power converter 10 of the set in which the switching devices do not fail, the AC rotary machine 2 can generate torque usually. In this case, by changing the current component of the d-axis concerning the three phase windings of the set with no failure, the magnetic flux in the d-axis direction where the magnetic flux of the permanent magnet exists can be changed. That is to say, the flux linkage in the d-axis direction by the permanent magnet can be changed apparently. This change of the flux linkage in the d-axis direction acts also on the three phase windings of the failed set. According to the above configuration, since the current component of the d-axis changes according to the state of the AC rotary machine 2 related to the three phase windings of the failed set, the state of the AC rotary machine 2 related to the three phase windings of the failed set can be changed appropriately. Therefore, even when the switching device failed, the AC rotary machine 2 can be driven appropriately.

In the present embodiment, as shown in the block diagram of FIG. 3, about the set in which the switching device failed, the switching control unit 31 switches from on/off control of the switching devices by performing the dq-axis current control by the dq-axis current control unit 35, to on/off control of the switching devices by performing the failure on/off control by the failure on/off control unit 36. On the other hand, about the set in which the switching device does not fail, the switching control unit 31 continues the on/off control of the switching devices by performing the dq-axis current control by the dq-axis current control unit 35, and corrects the d-axis base current command value Idcb by performing the d-axis current correction by the d-axis current correction unit 45. The d-axis current correction unit 45 calculates a d-axis current correction value ΔIdc, and corrects the d-axis base current command value Idcb calculated by the base current command calculation unit 40, by d-axis current correction value MIdc (Idc=Idcb+ΔIdc).

By the way, in the permanent magnet synchronous AC rotary machine, rotation of the rotor generates the induced voltage also in the windings of the failed set by the permanent magnet attached to the rotor. This induced voltage Vind can be expressed as in the equation (1), by setting the electrical angle speed of the rotor to ω [rad/s], and setting the flux linkage by the permanent magnet to Φa [Wb].

$$Vind = \omega \times \Phi a \qquad (1)$$

It is seen from the equation (1) that the induced voltage Vind generated in the windings of the failed set increases, as the electrical angle speed a of the rotor increases. If the induced voltage Vind applied to the electric power converter 10 from the windings increases too much, there is a possibility of exceeding the breakdown voltage limit of the switching devices, and it is not desirable.

In the present embodiment, when the short circuit failure of the positive electrode side switching device or the open circuit failure of the negative electrode side switching device is detected by the failure detection unit 32, the failure on/off control unit 36, about the electric power converter 10 of the set in which the switching device failed, perform failure on/off control that turns on the respective phase switching devices of the positive electrode side, and turns off the respective phase switching devices of the negative electrode side.

According to this configuration, when the short circuit failure of the positive electrode side switching device occurs, the positive electrode side switching devices of all three phases are made into on state similar to the state where the short circuit failure occurred, and the negative electrode side switching devices of all three phases are made into off state. On the other hand, when the open circuit failure of the negative electrode side switching device occurs, the positive electrode side switching devices of all three phases are made into on state, and the negative electrode side switching devices of all three phases are made into off state similar to the state where the open circuit failure occurred.

Therefore, when the short circuit failure of the positive electrode side switching device or the open circuit failure of the negative electrode side switching device occurs, the positive electrode side switching devices of all three phases are made into on state, and the negative electrode side switching devices of all three phases are made into off state. If it becomes all on state of the positive electrode side of three phases and all off state of the negative electrode side of three phases, current recirculates between the electric power converter 10 of the failed set and the windings, and the induced voltage applied to the electric power converter 10 from the windings can be lowered. Therefore, to an increase in the electrical angle speed of the rotor, the increase in the induced voltage can be suppressed, and the applied voltage can be suppressed from exceeding the breakdown voltage of the switching device.

On the other hand, in all on state of the positive electrode side of three phases and all off state of the negative electrode side of three phases, since reflux current flows into the windings of the failed set, the brake torque which is a negative torque is generated in the rotor. The torque T of the AC rotary machine 2 can be expressed in the equation (2) in the dq-axis rotating coordinate system.

$$T=Pn\times\Phi a\times Iq+Pn\times(Ld-Lq)\times Id\times Iq \quad (2)$$

Here, Pn is the number of pole pairs of the permanent magnet, Ld is d-axis inductance, and Lq is q-axis inductance. Since Ld and Lq are generally small enough as compared with Id and Iq, the first term of the equation (2), that is, the q-axis current Iq, becomes dominant.

Relational equations between voltage and current in the dq-axis rotating coordinate system can be expressed in the equation (3) and the equation (4).

$$Vd=Ra\times Id-\omega\times Lq\times Iq \quad (3)$$

$$Vq=Ra\times Iq+\omega\times(Ld\times Id+\Phi a) \quad (4)$$

Here, Vd is d-axis voltage, Vq is q-axis voltage, and Ra is resistance of the winding of one phase.

In the case of all on state of the positive electrode side of three phases and all off state of the negative electrode side of three phases, since it becomes Vd=0 and Vq=0, Id and Iq at this time are derived as the equation (5) and the equation (6) from the equation (3) and the equation (4).

$$Id=-(\Phi a\times\omega^2\times Lq)/(Ra^2+\omega^2\times Ld\times Lq) \quad (5)$$

$$Iq=-(\Phi a\times\omega\times Ra)/(Ra^2+\omega^2\times Ld\times Lq) \quad (6)$$

As mentioned above, in the case of all on state of the positive electrode side of three phases and all off state of the negative electrode side of three phases, since the q-axis current Iq is dominant, by decreasing the magnitude (absolute value) of the q-axis current Iq which flows through the windings of the failed set and can be expressed by the equation (6), the magnitude (absolute value) of the brake torque by the windings of the failed set can be decreased.

By the way, if the d-axis current Id flowing through the windings of the set which does not fail is made to increase in the negative direction, the flux linkage Φa by the permanent magnet can be decreased apparently. If the flux linkage Φa is decreased, from the equation (6), the magnitude of the q-axis current Iq which flows through the windings of the failed set can be decreased, and the magnitude of the brake torque can be decreased.

Then, the driving condition detection unit 33 calculates the brake torque which is generated on the rotor by the windings of the failed set, as the state of the AC rotary machine 2 related to the windings of the failed set. Then, about the electric power converter 10 of the set in which the switching devices do not fail, the d-axis current correction unit 45 performs d-axis current correction that increases the current component of the d-axis in the negative direction so as to decrease the magnitude (absolute value) of the brake torque detected by the driving condition detection unit 33. Here, "increasing the current component of the d-axis in the negative direction" means "decreasing the current component of the d-axis".

According to this configuration, by increasing the current component of the d-axis which flows through the windings of the set which does not fail in the negative direction, the flux linkage Φa by the permanent magnet can be decreased apparently, and the brake torque by the windings of the failed set can be decreased appropriately.

The d-axis current command value Idc after correction by the d-axis current correction unit 45 increases in the negative direction from the d-axis base current command value Idcb calculated by the base current command calculation unit 40. That is to say, the d-axis current correction value ΔIdc which corrects the d-axis base current command value Idcb becomes a negative value.

The driving condition detection unit 33 calculates the brake torque Tf generated by the windings of the failed set using the equation (7), based on the flux linkage (Φa+Ldr×Idr) by the permanent magnet after demagnetized apparently by the d-axis current Idr of the set which does not fail, and the q-axis current Iqf of the failed set. Here, Ldr is d-axis inductance of the winding of the set which does not fail.

$$Tf=Pn\times(\Phi a+Ldr\times Idr)\times Iqf \quad (7)$$

The d-axis current correction unit 45 increases the current component of the d-axis of the set which does not fail in the negative direction so that the magnitude (absolute value) of the brake torque Tf becomes less than or equal to a preliminarily set maximum torque value. The d-axis current correction unit 45 increases the d-axis current correction value ΔIdc in the negative direction until the magnitude (absolute value) of the brake torque Tf becomes less than or equal to the maximum torque value. In order to deal with changing of the q-axis current Iqf according to the electrical angle speed ω of the rotor and changing of the brake torque Tf according to the q-axis current Iqf, the d-axis current correction unit 45 may increase the d-axis current correction value ΔIdc in the positive direction, when the magnitude (absolute value) of the brake torque Tf becomes smaller than the maximum torque value. The d-axis current correction unit 45 upper-limits the d-axis current correction value ΔIdc by zero. Even in this case, the d-axis current correction value ΔIdc becomes a negative value, and the d-axis current correction unit 45 increases the d-axis current Id in the negative direction from the d-axis base current command value Idcb.

The procedure of processing at failure by the controller 1 will be explained based on the flowchart shown in FIG. 4. The processing of the flowchart in FIG. 4 is recurrently implemented, for example, every constant operation cycle while the computing processing unit 90 of the controller 30 implements software (a program) stored in the storage apparatus 91.

First, in the step S01, the failure detection unit 32, about each set of the electric power converters 10, perform failure detection processing that detects short circuit failure and open circuit failure of each switching device. In the step S02, the failure detection unit 32 determines whether or not the short circuit failure of the positive electrode side switching device or the open circuit failure of the negative electrode side switching device is detected. When neither the short circuit failure of the positive electrode side nor the open circuit failure of the negative electrode side is detected (the step S02: No), the failure detection unit 32 returns to the step S01 and continues the failure detection processing.

When the short circuit failure of the positive electrode side switching device or the open circuit failure of the negative electrode side switching device is detected (the step S02: Yes), in the step S03, about the set of the electric power converter 10 in which the switching device failed, the failure on/off control unit 36 performs the failure on/off control processing that turns on the respective phase switching devices of the positive electrode side, and turns off the respective phase switching devices of the negative electrode side.

Next, in the step S04, the driving condition detection unit 33 performs processing that detects the brake torque generated by the windings of the failed set. In the step S05, the d-axis current correction unit 45 determines whether or not the magnitude (absolute value) of the brake torque is less than or equal to the maximum torque value. Then, when the brake torque is not less than or equal to the maximum torque value (the step S05: No), the d-axis current correction unit 45 performs the d-axis current correction that increases the current component of the d-axis of the set which does not fail in the negative direction in the step S06, then returns to the step S04. On the other hand, when the brake torque is less than or equal to the maximum torque value (the step S05: Yes), the d-axis current correction unit 45 ends the d-axis current correction that increases the current component of the d-axis in the negative direction.

2. Embodiment 2

Next, the controller 1 according to Embodiment 2 will be explained. The explanation for constituent parts the same as those in Embodiment 1 will be omitted. Although the basic configuration and processing of the AC rotary machine 2 and the controller 1 according to the present embodiment are the same as those of Embodiment 1, the present embodiment is different from Embodiment 1 in the failure pattern of the switching devices in which the switching control unit 31 deals with, and the on-off pattern of the switching devices at the failure determination.

In the present embodiment, when the open circuit failure of the positive electrode side switching device or the short circuit failure of the negative electrode side switching device is detected by the failure detection unit 32, the failure on/off control unit 36, about the electric power converter 10 of the set in which the switching device failed, perform failure on/off control that turns off the respective phase switching devices of the positive electrode side, and turns on the respective phase switching devices of the negative electrode side.

According to this configuration, when the open circuit failure of the positive electrode side switching device occurs, the positive electrode side switching devices of all three phases are made into off state similar to the state where the open circuit failure occurred, and the negative electrode side switching devices of all three phases are made into on state. On the other hand, when the short circuit failure of the negative electrode side switching device occurs, the positive electrode side switching devices of all three phases are made into off state, and the negative electrode side switching devices of all three phases are made into on state similar to the state where the short circuit failure occurred.

Therefore, when the open circuit failure of the positive electrode side switching device or the short circuit failure of the negative electrode side switching device occurs, the positive electrode side switching devices of all three phases are made into off state, and the negative electrode side switching devices of all three phases are made into on state. If it becomes all off state of the positive electrode side of three phases and all on state of the negative electrode side of three phases, as is the case with Embodiment 1 mentioned above, current recirculates between the electric power converter 10 of the failed set and the windings, and the induced voltage applied to the electric power converter 10 from the windings can be lowered. Therefore, to an increase in the electrical angle speed of the rotor, the increase in the induced voltage can be suppressed, and the applied voltage can be suppressed from exceeding the breakdown voltage of the switching device.

As is the case with Embodiment 1 mentioned above, the driving condition detection unit 33 calculates the brake torque generated by the windings of the failed set, as the state of the AC rotary machine 2 related to the windings of the failed set. Then, as is the case with Embodiment 1 mentioned above, about the electric power converter 10 of the set in which the switching devices do not fail, the d-axis current correction unit 45 performs d-axis current correction that increases the current component of the d-axis in the negative direction so as to decrease the magnitude (absolute value) of the brake torque detected by the driving condition detection unit 33.

According to this configuration, as is the case with Embodiment 1 mentioned above, by increasing the current component of the d-axis which flows through the windings of the set which does not fail in the negative direction, the flux linkage Φa by the permanent magnet can be decreased apparently, and the brake torque by the windings of the failed set can be decreased appropriately.

Next, the flowchart in FIG. 5 according to the present embodiment will be explained. First, in the step S11, the failure detection unit 32, about each set of the electric power converters 10, perform the failure detection processing that detects short circuit failure and open circuit failure of each switching device. In the step S12, the failure detection unit 32 determines whether or not the open circuit failure of the positive electrode side switching device or the short circuit failure of the negative electrode side switching device is detected. When the open circuit failure of the positive electrode side switching device or the short circuit failure of the negative electrode side switching device is detected (the step S12: Yes), in the step S13, about the set of the electric power converter 10 in which the switching device failed, the failure on/off control unit 36 performs the failure on/off control processing that turns off the respective phase switching devices of the positive electrode side, and turns on the respective phase switching devices of the negative electrode side.

Next, in the step S14, the driving condition detection unit 33 performs processing that calculates the brake torque generated by the windings of the failed set. In the step S15, the d-axis current correction unit 45 determines whether or not the magnitude (absolute value) of the brake torque is less than or equal to the maximum torque value. Then, when brake torque is not less than or equal to the maximum torque value (the step S15: No), the d-axis current correction unit 45 performs the d-axis current correction that increases the current component of the d-axis of the set which does not fail in the negative direction in the step S16, then returns to the step S14. On the other hand, when the brake torque is less than or equal to the maximum torque value (the step S15: Yes), the d-axis current correction unit 45 ends the d-axis current correction that increases the current component of the d-axis in the negative direction.

3. Embodiment 3

Next, the controller 1 according to Embodiment 3 will be explained. The explanation for constituent parts the same as those in Embodiment 1 will be omitted. Although the basic configuration and processing of the AC rotary machine 2 and the controller 1 according to the present embodiment are the same as those of Embodiment 1, the present embodiment is different from Embodiment 1 in the failure pattern of the switching devices in which the switching control unit 31 deals with, and the on-off pattern of the switching devices at the failure determination.

In the present embodiment, when the open circuit failure of the positive electrode side switching device and the open circuit failure of the negative electrode side switching device is detected by the failure detection unit 32 about the electric power converter 10 of the same set, the failure on/off control unit 36, about the electric power converter 10 of the set in which the switching device failed, perform the failure on/off control that turns off the respective phase switching devices of the positive electrode side, and turns off the respective phase switching devices of the negative electrode side. Here, the phase of the positive electrode side switching device and the phase of the negative electrode side switching device in which the open circuit failures were detected may be the same phases, and may be different phases.

If the open circuit failure occurs in both the positive electrode side and the negative electrode side switching devices, unlike the above Embodiments 1 and 2, it cannot set to all on state of the positive electrode side and all off state of the negative electrode side, or all off state of the positive electrode side and all on state of the negative electrode side. According to the above configuration, when the open circuit failure occurs in both the positive electrode side and the negative electrode side switching devices of the electric power converter 10 of the same set, all the switching devices of the failed set are set to off state, and torque fluctuation, such as torque ripple, can be prevented from occurring in the AC rotary machine 2.

On the other hand, since all the switching devices of the failed set are turned off, current does not flow into the windings of the failed set. Therefore, unlike the above Embodiments 1 and 2, by refluxing current between the electric power converter 10 and the windings, the induced voltage applied to the electric power converter 10 from the windings cannot be lowered. Accordingly, as shown in the equation (1), as the electrical angle speed G of the rotor increases, the induced voltage increases. When the induced voltage is lower than the power source voltage, since the switching device is in an open state, current does not flow. On the other hand, when the induced voltage becomes higher than the power source voltage, current flows into the DC power source side from the windings side through the free wheel diode 5 which are connected in inverse parallel with the respective switching devices.

Then, in the present embodiment, the driving condition detection unit 33 detects the charging current which flows into the DC power source 4 side from the windings of the failed set, as the state of the AC rotary machine 2 related to the windings of the failed set. Then, about the electric power converter 10 of the set in which the switching devices do not fail, the d-axis current correction unit 45 performs the d-axis current correction that increases the current component of the d-axis in the negative direction so as to decrease the charging current detected by the driving condition detection unit 33.

If the d-axis current Id flowing through the windings of the set which does not fail is made to increase in the negative direction, the flux linkage ca by the permanent magnet can be decreased apparently. If the flux linkage (a is decreased, from the equation (1), the induced voltage generated in the windings of the failed set can be decreased, and the charging current can be decreased. Therefore, by increasing the current component of the d-axis of the set which does not fail in the negative direction, the charging current by the induced voltage of the failed set can be lowered appropriately.

In the present embodiment, the driving condition detection unit 33 detects the charging current which flows from the DC power source 4 side from the windings of the failed set, based on the current value detected by the current sensor 14 of the failed set. The d-axis current correction unit 45 increases the current component of the d-axis of the set which does not fail in the negative direction so that the magnitude (absolute value) of the charging current becomes less than or equal to a preliminarily set upper limit current value. The d-axis current correction unit 45 increases the d-axis current correction value ΔIdc in the negative direction until the magnitude (absolute value) of the charging current becomes less than or equal to the upper limit current value. In order to deal with changing of the induced voltage according to the electrical angle speed ω of the rotor and changing of the charging current according to the induced voltage, the d-axis current correction unit 45 may increase the d-axis current correction value ΔIdc in the positive direction, when the magnitude (absolute value) of the charging current becomes smaller than the upper limit current value. The d-axis current correction unit 45 upper-limits the d-axis current correction value ΔIdc by zero. Even in this case, the d-axis current correction value ΔIdc becomes a negative value, and the d-axis current correction unit 45 increases the d-axis current Id in the negative direction from the d-axis base current command value Idcb.

The d-axis current correction unit 45 may change the upper limit current value according to the charging state of the DC power source 4. For example, the d-axis current correction unit 45 increases the upper limit current value in case of charging the DC power source 4, and sets the upper limit current value to 0 in case of not charging the DC power source 4.

Next, the flowchart in FIG. 6 according to the present embodiment will be explained. First, in the step 21, the failure detection unit 32, about each set of the electric power converters 10, perform the failure detection processing that detects short circuit failure and open circuit failure of each switching device. In the step S22, the failure detection unit 32 determines whether or not the open circuit failure of the positive electrode side switching device and the open circuit failure of the negative electrode side switching device were detected about the electric power converter 10 of the same set. When the open circuit failure of the positive electrode side and the negative electrode side switching devices is detected (the step S22: Yes), in the step S23, about the set of the electric power converter 10 in which the switching device failed, the failure on/off control unit 36 performs the failure on/off control processing that turns off the respective phase switching devices of the positive electrode side, and turns off the respective phase switching devices of the negative electrode side.

Next, in the step S24, the driving condition detection unit 33 performs processing that detects the charging current which flows into the DC power source 4 side from the windings of the failed set. In the step S25, the d-axis current correction unit 45 determines whether or not the magnitude (absolute value) of the charging current is less than or equal to the upper limit current value. Then, when the charging current is not less than or equal to the upper limit current value (the step S25: No), the d-axis current correction unit 45 performs the d-axis current correction that increases the current component of the d-axis of the set which does not fail in the negative direction in the step S26, then returns to the step S24. On the other hand, when the charging current is less than or equal to the upper limit current value (the step S25: Yes), the d-axis current correction unit 45 ends the d-axis current correction that increases the current component of the d-axis in the negative direction.

4. Embodiment 4

Next, the controller 1 according to Embodiment 4 will be explained. The explanation for constituent parts the same as those in Embodiment 1 will be omitted. Although the basic configuration and processing of the AC rotary machine 2 and the controller 1 according to the present embodiment are the same as those of Embodiment 1, the present embodiment is different from Embodiment 1 in the state of the AC rotary machine 2 related to the windings of the failed set which is detected by the driving condition detection unit 33.

When the positive electrode side switching devices of all three phases are made into on state and the negative electrode side switching devices of all three phases are made into off state about the failed set like the above Embodiment 1, since reflux current flows into the windings of the failed set, Joule heat is generated and the temperature of the windings rises.

If the temperature of the windings rises and exceeds the maximum temperature, there is a possibility that the windings may fail.

A calorific value We of the winding is proportional to a square of the current Ia which is flowing into the winding, as shown in the equation (8).

$$Wc = Ra \times Ia^2 \qquad (8)$$

The winding current Ia is expressed by the equation (9). If the d-axis current Id and the q-axis current Iq decrease, the winding current Ia decreases. Here, Ie is an effective value of the current which flows into each phase.

$$Ia = \sqrt{3} \times Ie = \sqrt{(Id^2 + Iq^2)} \qquad (9)$$

As explained in above Embodiment 1, if the d-axis current Id flowing through the windings of the set which does not fail is made to increase in the negative direction, the flux linkage ma by the permanent magnet can be decreased apparently. If the flux linkage Φa is decreased, the magnitude of the q-axis current Iq which flows through the windings of the failed set can be decreased. Therefore, the winding current Ia of the failed set can be decreased and the calorific value We of the winding of the failed set can be reduced.

Then, in the present embodiment, the driving condition detection unit 33 detects a temperature of the winding of the failed set, as the state of the AC rotary machine 2 related to the windings of the failed set. Then, about the electric power converter 10 of the set in which the switching devices do not fail, the d-axis current correction unit 45 performs the d-axis current correction that increases the current component of the d-axis in the negative direction so as to decrease the temperature of the winding of the failed set detected by the driving condition detection unit 33.

According to this configuration, by increasing the current component of the d-axis which flows through the windings of the set which does not fail in the negative direction, decreasing the flux linkage (a by the permanent magnet apparently, and decreasing the winding current of the failed set, the temperature of the winding of the failed set can be decreased appropriately.

The driving condition detection unit 33 detects the winding temperature of the failed set based on the output signal of the winding temperature sensor 7 provided in the winding of the failed set. The d-axis current correction unit 45 increases the current component of the d-axis of the set which does not fail in the negative direction so that the winding temperature of the failed set becomes less than or equal to a preliminarily set upper limit temperature value.

The d-axis current correction unit 45 increases the d-axis current correction value ΔIdc in the negative direction until the winding temperature of the failed set becomes less than or equal to the upper limit temperature value. In order to deal with changing of the q-axis current Iq according to the electrical angle speed c of the rotor and changing of the calorific value of the winding according to the q-axis current Iq, the d-axis current correction unit 45 may increase the d-axis current correction value ΔIdc in the positive direction, when the winding temperature of the failed set becomes smaller than the upper limit temperature value. The d-axis current correction unit 45 upper-limits the d-axis current correction value ΔIdc by zero. Even in this case, the d-axis current correction value ΔIdc becomes a negative value, and the d-axis current correction unit 45 increases the d-axis current Id in the negative direction from the d-axis base current command value Idcb.

Next, the flowchart in FIG. 7 according to the present embodiment will be explained. First, in the step 31, the failure detection unit 32, about each set of the electric power converters 10, perform the failure detection processing that detects short circuit failure and open circuit failure of each switching device. In the step S32, the failure detection unit 32 determines whether or not the short circuit failure of the positive electrode side switching device or the open circuit failure of the negative electrode side switching device is detected. When the short circuit failure of the positive electrode side switching device or the open circuit failure of the negative electrode side switching device is detected (the step S32: Yes), in the step S33, about the set of the electric power converter 10 in which the switching device failed, the failure on/off control unit 36 performs the failure on/off control processing that turns on the respective phase switching devices of the positive electrode side, and turns off the respective phase switching devices of the negative electrode side.

Next, in the step S34, the driving condition detection unit 33 performs processing that detects the winding temperature of the failed set. In the step S35, the d-axis current correction unit 45 determines whether or not the winding temperature of the failed set is less than or equal to the upper limit temperature value. Then, when the winding temperature of the failed set is not less than or equal to the upper limit temperature value (the step S35: No), the d-axis current correction unit 45 performs the d-axis current correction that increases the current component of the d-axis of the set which does not fail in the negative direction in the step S36, then returns to the step S34. On the other hand, when the winding temperature of the failed set is less than or equal to the upper limit temperature value (the step S35: Yes), the d-axis current correction unit 45 ends the d-axis current correction that increases the current component of the d-axis in the negative direction.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiments 1 to 3, different failure patterns of the switching devices in which the switching control unit 31 deals with and different on-off patterns of the switching devices at failure determination were explained. However, embodiments of the present disclosure are not limited to the foregoing case. That is to say, the above Embodiments 1 to 3 may be arbitrarily combined, and embodiment may be configured to deal with a plurality of the failure patterns of the switching devices. For example, Embodiments 1 and 2 are combined, and it may be configured to deal with the case where the positive electrode side switching device causes the open circuit failure or the short circuit failure, and the case where the negative electrode side switching device causes the open circuit failure or the short circuit failure; or Embodiments 1 to 3 are all combined, and it may be configured to further deal with the case where the positive electrode side and the negative electrode side switching devices causes the open circuit failure.

(2) In the above-mentioned Embodiment 4, there has been explained the case where the failure pattern of the switching devices in which the switching control unit 31 deals with and the on-off pattern of the switching devices at failure determination are configured similar to Embodiment 1, and the current component of the d-axis is increased in the negative direction so that the temperature of the windings of the failed set decreases. However, embodiments of the present disclosure are not limited to the foregoing case. That is to say, the failure pattern of the switching devices in which the switching control unit 31 deals with and the on-off pattern of the switching devices at failure determination may be configured similar to Embodiment 2 or 3, and the current component of the d-axis may be increased in the negative direction so that the temperature of the windings of the failed set decreases.

(3) In the above-mentioned Embodiment 3, there has been explained the case where the driving condition detection unit 33 detects the charging current which flows into the DC power source 4 side from the windings of the failed set, as the state of the AC rotary machine 2 related to the windings of the failed set; and about the electric power converter 10 of the set in which the switching devices do not fail, the d-axis current correction unit 45 performs the d-axis current correction that increases the current component of the d-axis in the negative direction so as to decrease the charging current. However, embodiments of the present disclosure are not limited to the foregoing case. That is to say, in the above-mentioned Embodiment 3, the driving condition detection unit 33 may detect the induced voltage generated in the windings of the failed set, as the state of the AC rotary machine 2 related to the windings of the failed set; and about the electric power converter 10 of the set in which the switching devices do not fail, the d-axis current correction unit 45 may perform the d-axis current correction that increases the current component of the d-axis in the negative direction so as to decrease the induced voltage detected by the driving condition detection unit 33. In this case, the driving condition detection unit 33 calculates the induced voltage Vindf generated by the windings of the failed set using the equation (10), based on the flux linkage ($\Phi a + Ldr \times Idr$) by the permanent magnet after demagnetized apparently by the d-axis current Idr of the set which does not fail, and the electrical angle speed ω of the rotor.

$$Vindf = \omega \times ((\Phi a + Ldr \times Idr)) \qquad (10)$$

The d-axis current correction unit 45 may increase the current component of the d-axis of the set which does not fail in the negative direction so that the induced voltage becomes less than or equal to a preliminarily set upper limit induced voltage value. The d-axis current correction unit 45 increases the d-axis current correction value ΔIdc in the negative direction until the induced voltage becomes less than or equal to the upper limit induced voltage value. In order to deal with changing of the induced voltage according to the electrical angle speed ω of the rotor and the like, the d-axis current correction unit 45 may increase the d-axis current correction value ΔIdc in the positive direction, when the induced voltage becomes smaller than the upper limit induced voltage value. The d-axis current correction unit 45 upper-limits the d-axis current correction value ΔIdc by zero. Even in this case, the d-axis current correction value ΔIdc becomes a negative value, and the d-axis current correction unit 45 increases the d-axis current Id in the negative direction from the d-axis base current command value Idcb.

(4) There has been explained the case where about the set of the electric power converter 10 in which the switching device does not fail, the switching control unit 31 increases the current component of the d-axis in the negative direction so that the magnitude of the brake torque decreases in the above-mentioned Embodiments 1 and 2; increases the current component of the d-axis in the negative direction so that the charging current (or the induced voltage) decreases in Embodiment 3; and increases the current component of the d-axis in the negative direction so that the winding temperature decreases in Embodiment 4. However, embodiments of the present disclosure are not limited to the foregoing case. That is to say, about the set of the electric power converter 10 in which the switching device does not fail, the switching control unit 31 may change the current component of the d-axis according to the state of the AC rotary machine 2 related to the winding of the failed set. For example, the switching control unit 31 may increase the current component of the d-axis in the positive direction so as to increase the magnitude of the brake torque; may increase the current component of the d-axis in the positive direction so as to increase the charging current (or the induced voltage); or may increase the current component of the d-axis in the positive direction so as to increase the winding temperature.

Various modifications and alterations of this disclosure will be apparent to those skilled in the art without departing from the scope and spirit of this disclosure, and it should be understood that this is not limited to the illustrative embodiments set forth herein.

INDUSTRIAL APPLICABILITY

The present disclosure can be preferably used for a controller for an AC rotary machine that controls an inverter, which is provided with a plurality of switching devices and performs power conversion between a DC power source and the AC rotary machine.

REFERENCE SIGNS LIST

1: Controller for AC rotary machine
2: AC Rotary Machine
4: DC Power Source
10: Electric power converter
31: switching control unit,
32: Failure detection unit
33: Driving Condition Detection Unit

What is claimed is:

1. A controller for an AC rotary machine provided with a stator that is provided with m sets (m is a natural number of greater than or equal to two) of n-phase windings (n is a natural number of greater than or equal to two) and a rotor that is provided with a permanent magnet, the controller for the AC rotary machine comprising:

the m sets of an electric power converter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a switching controller that, about each set of the m sets, performs dq-axis current control that controls currents flowing into the windings on a dq-axis rotating coordinate system consisting of a d-axis defined in a N pole direction of the permanent magnet and a q-axis defined in a direction advanced to the d-axis by 90 degrees in an electrical angle, and performs on/off control of the each switching device;

a failure detector that detects at least one of short circuit failure and open circuit failure of the each switching device; and a driving condition detector that detects a state of the AC rotary machine related to the windings of a set in which the switching device failed, wherein when failure of the switching device is detected by the failure detector, the switching controller, about the electric power converter of the set in which the switching device failed, stops the on/off control of the switching devices by the dq-axis current control, and turns on, in the case of the short circuit failure, and turns off, in the case of the open circuit failure, at least the respective phase switching devices of the positive electrode side or the negative electrode side which is the same side as the failed switching device; and about the electric power converter of a set in which the switching devices do not fail, continues the on/off control of the switching devices by the dq-axis current control, and changes a current component of the d-axis according to the state of the AC rotary machine related to the windings of the failed set, detected by the driving condition detector, when the short circuit failure of the positive electrode side switching device or the open circuit failure of the negative electrode side switching device is detected by the failure detector, the switching controller, about the electric power converter of the set in which the switching device failed, turns on the respective phase switching devices of the positive electrode side and turns off the respective phase switching devices of the negative electrode side, when the open circuit failure of the switching device of the positive electrode side or the short circuit failure of the switching device of the negative electrode side is detected by the failure detector, the switching controller, about the electric power converter of the set in which the switching device failed, turns off the respective phase switching devices of the positive electrode side and turns on the respective phase switching devices of the negative electrode side, wherein the driving condition detector calculates a brake torque generated by the windings of the failed set, as the state of the AC rotary machine related to the windings of the failed set, wherein the switching controller, about the electric power converter of the set in which the switching devices do not fail, increases the current component of the d-axis in a negative direction so as to decrease a magnitude of the brake torque detected by the driving condition detector, and wherein the switching controller increases the current component of the d-axis of the set which does not fail in the negative direction until the magnitude of the brake torque becomes less than or equal to a preliminarily set maximum torque value.

2. The controller for the AC rotary machine according to claim 1, wherein by setting the brake torque generated by the windings of the failed set to Tf, setting number of pole pairs of the permanent magnet to Pn, setting a flux linkage by the permanent magnet to φa, setting the d-axis inductance of the winding of the set which does not fail to Ldr, setting the d-axis current of the set which does not fail to Idr, and setting the q-axis current of the failed set to Iqf, the driving condition detection unit calculates the brake torque generated by the windings of the failed set by a calculation equation of $$Tf = Pn \times (\varphi a + Ldr \times Idr) \times Iqf$$

3. A controller for an AC rotary machine provided with a stator that is provided with m sets (m is a natural number of greater than or equal to two) of n-phase windings (n is a natural number of greater than or equal to two) and a rotor that is provided with a permanent magnet, the controller for the AC rotary machine comprising:

the m sets of an electric power converter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a switching controller that, about each set of the m sets, performs dq-axis current control that controls currents flowing into the windings on a dq-axis rotating coordinate system consisting of a d-axis defined in a N pole direction of the permanent magnet and a q-axis defined in a direction advanced to the d-axis by 90 degrees in an electrical angle, and performs on/off control of the each switching device;

a failure detector that detects at least one of short circuit failure and open circuit failure of the each switching device; and a driving condition detector that detects a state of the AC rotary machine related to the windings of a set in which the switching device failed, wherein when failure of the switching device is detected by the failure detector, the switching controller, about the electric power converter of the set in which the switching device failed, stops the on/off control of the switching devices by the dq-axis current control, and turns on, in the case of the short circuit failure, and turns off, in the case of the open circuit failure, at least the respective phase switching devices of the positive electrode side or the negative electrode side which is the same side as the failed switching device; and about the electric power converter of a set in which the switching devices do not fail, continues the on/off control of the switching devices by the dq-axis current control, and changes a current component of the d-axis according to the state of the AC rotary machine related to the windings of the failed set, detected by the driving condition detector, when the open circuit failure of the positive electrode side switching device and the open circuit failure of the negative electrode side switching device are detected by the failure detector about the electric power converter of the same set, the switching controller, about the electric power converter of the set in which the switching device failed, turns off the respective phase switching devices of the positive electrode side and turns off the respective phase switching devices of the negative electrode side, wherein the driving condition detector detects, as the state of the AC rotary machine related to the windings of the failed set, a charging current flowing into the DC power source from the windings of the failed set, or an induced voltage generated in the windings of the failed set, and wherein the switching controller, about the electric power converter of the set in which the switching devices do not fail, increases the current component of the d-axis in the negative direction so as to decrease the charging current or the induced voltage detected by the driving condition detector.

4. The controller for the AC rotary machine according to claim 3, by setting the induced voltage generated by the windings of the failed set to Vindf, setting an electrical angle speed of the rotor to ω, setting a flux linkage by the permanent magnet to ψa, setting the d-axis inductance of the winding of the set which does not fail to Ldr, and setting the d-axis current of the set which does not fail to Idr, the driving condition detection unit calculates the induced voltage generated by the windings of the failed set by a calculation equation of $$Vindf = \omega \times (\varphi a + Ldr \times Idr).$$

5. The controller for the AC rotary machine according to claim 3, wherein the switching controller increases the current component of the d-axis of the set which does not fail in the negative direction until a magnitude of the charging current becomes less than or equal to a preliminarily set upper limit current value, or increases the current component of the d-axis of the set which does not fail in the negative direction until the induced voltage becomes less than or equal to a preliminarily set upper limit induced voltage value.

6. A controller for an AC rotary machine provided with a stator that is provided with m sets (m is a natural number of greater than or equal to two) of n-phase windings (n is a natural number of greater than or equal to two) and a rotor that is provided with a permanent magnet, the controller for the AC rotary machine comprising:

the m sets of an electric power converter that is provided with the n sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phase of the n-phase;

a switching controller that, about each set of the m sets, performs dq-axis current control that controls currents flowing into the windings on a dq-axis rotating coordinate system consisting of a d-axis defined in a N pole direction of the permanent magnet and a q-axis defined in a direction advanced to the d-axis by 90 degrees in an electrical angle, and performs on/off control of the each switching device;

a failure detector that detects at least one of short circuit failure and open circuit failure of the each switching device; and a driving condition detector that detects a state of the AC rotary machine related to the windings of a set in which the switching device failed, wherein when failure of the switching device is detected by the failure detector, the switching controller, about the electric power converter of the set in which the switching device failed, stops the on/off control of the switching devices by the dq-axis current control, and turns on, in the case of the short circuit failure, and turns off, in the case of the open circuit failure, at least the respective phase switching devices of the positive electrode side or the negative electrode side which is the same side as the failed switching device; and about the electric power converter of a set in which the switching devices do not fail, continues the on/off control of the switching devices by the dq-axis current control, and changes a current component of the d-axis according to the state of the AC rotary machine related to the windings of the failed set, detected by the driving condition detector, when the short circuit failure of the positive electrode side switching device or the open circuit failure of the negative electrode side switching device is detected by the failure detector, the switching controller, about the electric power converter of the set in which the switching device failed, turns on the respective phase switching devices of the positive electrode side and turns off the respective phase switching devices of the negative electrode side, when the open circuit failure of the switching device of the positive electrode side or the short circuit failure of the switching device of the negative electrode side is detected by the failure detector, the switching controller, about the electric power converter of the set in which the switching device failed, turns off the respective phase switching devices of the positive electrode side and turns on the respective phase switching devices of the negative electrode side, when the open circuit failure of the positive electrode side switching device and the open circuit failure of the negative electrode side switching device are detected by the failure detector about the electric power converter of the same set, the switching controller, about the electric power converter of the set in which the switching device failed, turns off the respective phase switching devices of the positive electrode side and turns off the respective phase switching devices of the negative electrode side, wherein the driving condition detector detects a temperature of the winding of the failed set, as the state of the AC rotary machine related to the windings of the failed set, and wherein the switching controller, about the electric power converter of the set in which the switching devices do not fail, increases the current component of the d-axis in the negative direction so as to decrease the temperature of the windings of the failed set detected by the driving condition detector.

7. The controller for the AC rotary machine according to claim 6, wherein the switching controller increases the current component of the d-axis of the set which does not fail in the negative direction until the temperature of the windings of the failed set becomes less than or equal to a preliminarily set upper limit temperature value.

* * * * *